US008758024B2

United States Patent
Adachi et al.

(10) Patent No.: US 8,758,024 B2
(45) Date of Patent: Jun. 24, 2014

(54) ROTARY CONNECTOR DEVICE

(71) Applicants: Ryoichi Adachi, Shiga (JP); Kazutaka Kamiya, Shiga (JP)

(72) Inventors: Ryoichi Adachi, Shiga (JP); Kazutaka Kamiya, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 13/632,669

(22) Filed: Oct. 1, 2012

(65) Prior Publication Data

US 2013/0095670 A1    Apr. 18, 2013

Related U.S. Application Data

(63) Continuation of application No. PCT/JP2011/057341, filed on Mar. 25, 2011.

(30) Foreign Application Priority Data

Mar. 30, 2010 (JP) .................................. 2010-078597

(51) Int. Cl.
*H01R 39/00* (2006.01)
*H01R 35/04* (2006.01)
*B60R 16/02* (2006.01)

(52) U.S. Cl.
CPC ............ *B60R 16/0207* (2013.01); *H01R 35/04* (2013.01); *H01R 2201/26* (2013.01)
USPC .............................................. 439/15; 439/64

(58) Field of Classification Search
USPC ............................................ 439/10–15, 164
See application file for complete search history.

(56) References Cited

U.S. PATENT DOCUMENTS

| | | | | |
|---|---|---|---|---|
| 5,593,310 | A  * | 1/1997 | Kawamoto et al. | 439/164 |
| 6,409,527 | B1 * | 6/2002 | Adachi et al. | 439/164 |
| 7,104,821 | B2 * | 9/2006 | Araki et al. | 439/164 |
| 7,223,104 | B2 * | 5/2007 | Suenaga | 439/15 |
| 7,393,222 | B2 * | 7/2008 | Asakura | 439/164 |
| 7,934,931 | B2 * | 5/2011 | Kuroda et al. | 439/15 |
| 2008/0268661 | A1* | 10/2008 | Mitsui | 439/15 |
| 2009/0203232 | A1* | 8/2009 | Ida et al. | 439/15 |

FOREIGN PATENT DOCUMENTS

| | | |
|---|---|---|
| JP | 10-154565 A | 6/1998 |
| JP | 2003-187941 A | 7/2003 |
| JP | 2009-205915 A | 9/2009 |

OTHER PUBLICATIONS

International Search Report issued in PCT/JP2011/057341, mailed May 10, 2011, 1 page.

* cited by examiner

*Primary Examiner* — Thanh Tam Le
(74) *Attorney, Agent, or Firm* — Osha Liang LLP (57) ABSTRACT

A rotary connector device includes a stator and a rotator which rotates with respect to the stator concentrically with a steering; an accommodating space having a ring shape in a plan view, which is formed inside the stator and the rotator, and which accommodates a cable for electrically connecting the rotator and the stator in a wound state; and a retainer which is located on a bottom surface of the accommodating space so as to be able to guide the cable to rotate concentrically circle with the steering. The rotator includes an inner peripheral tube portion which forms an inner peripheral surface of the accommodating space. A rotator side abutting portion which abuts an upper surface inner peripheral portion of the retainer in a slidable manner is formed on a lower portion of the inner peripheral tube portion.

2 Claims, 10 Drawing Sheets

ROTARY CONNECTOR DEVICE

TECHNICAL FIELD

The present invention relates to a rotary connector device used for electrically connection between a steering wheel side and an automobile body. More specifically, the present invention relates to a rotary connector device comprising a retainer which is located on a bottom surface of an accommodating space for accommodating a cable wound in a circle and which guides the cable.

BACKGROUND ART

The rotary connector device mounted on a vehicle such as automobiles and the like includes a cable housing formed of a stator and a rotator to be assembled on a same axis so as to be relatively rotatable.

The rotary connector device has the stator secured to the automobile body and the rotator assembled on the steering wheel in the cable housing, and electrically connects a horn module, air bag module, power supply, and the like, for example, between the automobile body and the steering wheel.

In recent years, a rotary connector device comprising a retainer which is located on a bottom surface of an accommodating space and which guides the cable to rotate around a shaft of a steering has been proposed. With such a retainer, the cable wound in a circle in the accommodating space can smoothly move so as to follow a rotating operation of the steering.

A rotary connector device in Patent Document 1 is one of the rotary connector devices comprising retainers (moving bodies) as described above.

The retainer of Patent Document 1 is formed of a plurality of rollers and a ring-shaped rotating plate, and the rotating plate is placed on a bottom plate which forms a bottom surface of the accommodating space. An inner peripheral edge portion on an upper surface of the rotating plate and a lower edge portion of an inner peripheral tube portion (upper rotor) which forms an inner peripheral surface of the accommodating space abut each other planarly (see FIG. 3 in Patent Document 1).

When a steering rotates, the rotating plate and the inner peripheral tube portion respectively rotate around a shaft of the steering with edge surfaces which planarly contact each other sliding against each other.

In this example, since the abutting portions have planar shape, areas of the abutting portions are large. Smooth rotation is inhibited and it becomes impossible to guide rotation so as to follow movement of the cable. As a result, there are problems that a contact resistance between the cable and the retainer become large and cause abrasion, and that a load such as tension received by the cable from the retainer becomes large and cause the cable to be broken.

PRIOR ART DOCUMENT

Patent Document

Patent Document 1: Laid-Open Publication No. 2009-205915

SUMMARY OF THE INVENTION

Problems to be Solved by the Invention

An objective of the present invention is to provide a rotary connector device which smoothly rotate a retainer supporting a cable so as to follow movement of the cable in association with a rotating operation of a steering in an accommodating space to significantly reduce a load and/or contact resistance received by the cable from the retainer to prevent the cable from being broken.

Means for Solving the Problems

The present invention is characterized in that a rotary connector device includes a stator and a rotator which rotates with respect to the stator concentrically with a steering, an accommodating space having a ring shape in a plan view, which is formed inside the stator and the rotator, and which accommodates a cable for electrically connecting the rotator and the stator in a wound state, and a retainer which is located on a bottom surface of the accommodating space so as to be able to guide the cable to rotate concentrically circle with the steering, and in such a rotary connector device, the rotator includes an inner peripheral tube portion which forms an inner peripheral surface of the accommodating space, a rotator side abutting portion which abuts an upper surface inner peripheral portion of the retainer in a slidable manner is formed on a lower portion of the inner peripheral tube portion, a retainer side abutting portion which abuts the lower portion of the inner peripheral tube portion in a slidable manner is formed on the upper surface inner peripheral portion of the retainer, and a protruding abutting portion is formed on at least one of the rotator side abutting portion and the retainer side abutting portion so as to protrude toward the other.

In another embodiment of the present invention, a trench portion may be formed on a radially external side of the retainer with respect to the retainer side abutting portion.

In yet another embodiment of the present invention, the protruding abutting portion may be formed of a retainer side protruding abutting portion which protrudes from the retainer side abutting portion toward the rotator side abutting portion, and the trench portion may be formed into a trench shape which has a proximal end portion of the retainer side protruding abutting portion as a deepest portion and may be formed into a trench shape which becomes gradually shallower from the proximal end portion toward the radially external direction of the retainer.

Effect of the Invention

According to the present invention, a rotary connector device which can significantly reduce a load and/or contact resistance received by the cable from the retainer to prevent the cable from being broken can be provided.

DESCRIPTION OF EMBODIMENTS

An embodiment of the present invention is described hereinafter with reference to the drawings.

As shown in FIGS. 1 through 6, a steering roll connector 10 according to the present embodiment is formed of a cable housing 11, a retainer 41, and a rotation lock structure 51.

The cable housing 11 is formed into a substantially tubular shape with an insertion hole H which penetrates through in a direction of a rotating shaft of a steering (a vertical direction in FIG. 4) being formed in a central portion in a plan view. The insertion hole H is formed to have a diameter which allows a steering shaft (not shown) protruded from a column of the steering (not shown) to be inserted.

To an upper end of the steering shaft, a steering wheel for performing a rotating operation is secured.

Figure 3:
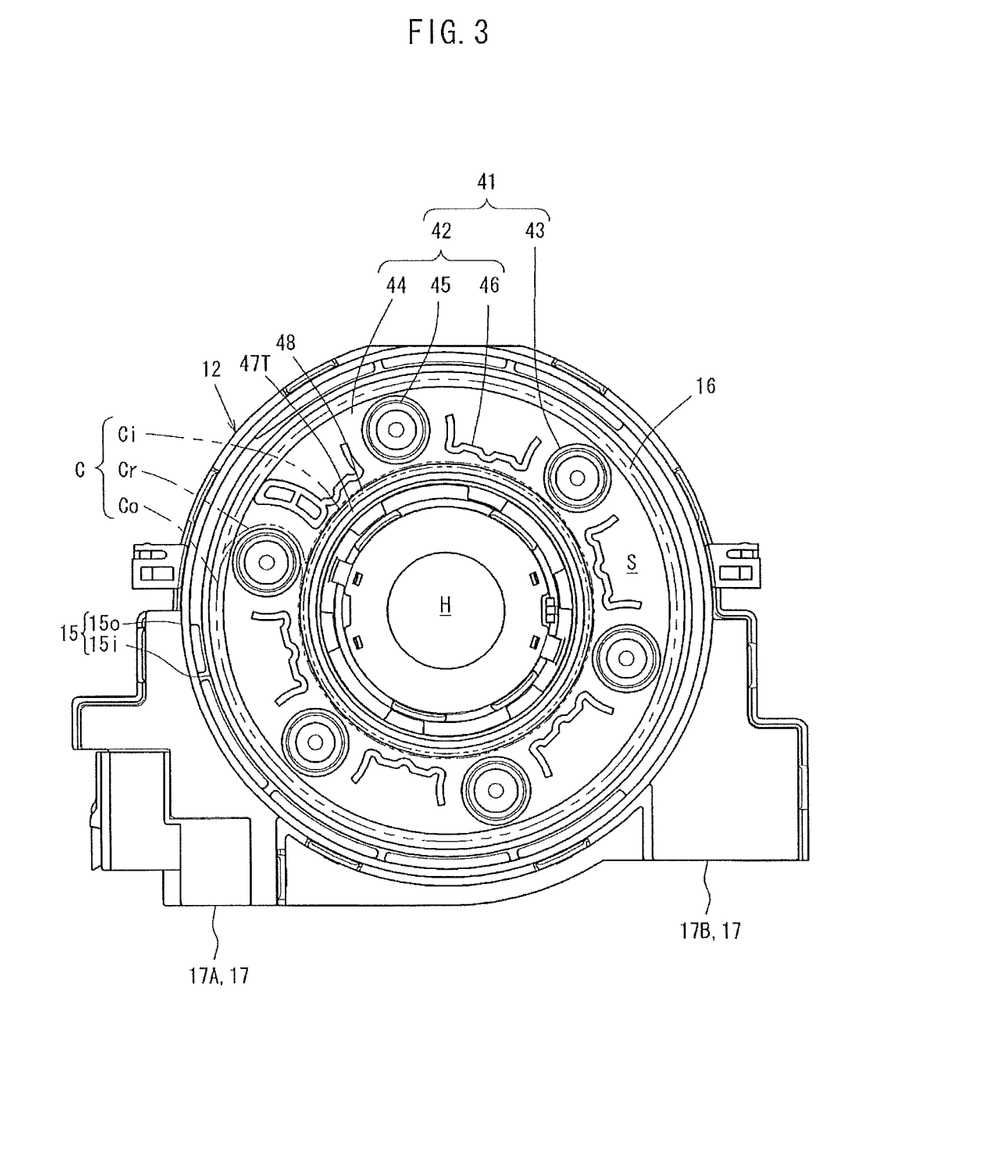
FIG. 3 A plan view of the steering roll connector of the present embodiment without a rotator.
Figure 4:
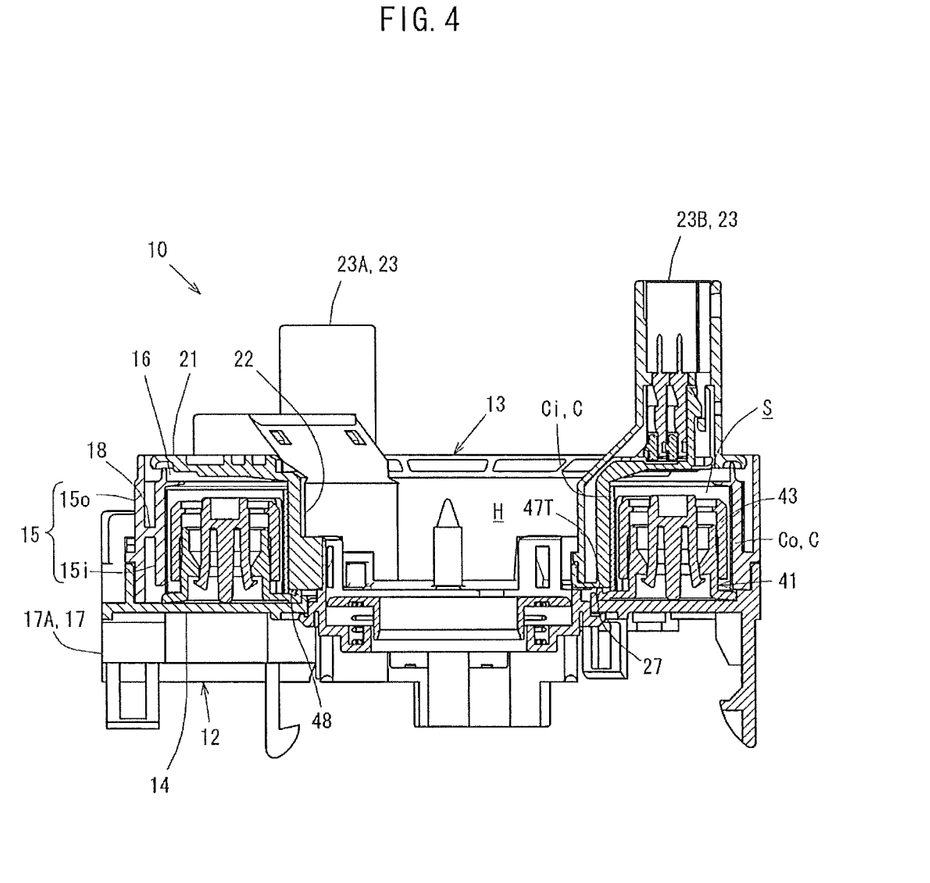
FIG. 4 A cross sectional view on arrow along line A-A.

The cable housing 11 is a case having a substantially tubular shape which is formed of a stator 12 and a rotator 13 which can relatively rotate with respect to each other. In the cable housing 11, an accommodating space S for accommodating a flexible flat cable C (hereinafter, referred to as "flat cable C") in an appropriately wound state is formed as shown in FIGS. 3 through 5.

The stator 12 is secured to an appropriate member of an automobile body, for example, a combination bracket switch (not shown) of the steering column, and is attached so as to be relatively rotatable with respect to the steering wheel. The stator 12 is formed of a securing side ring plate 14 formed in a ring shape as a bottom plate and an outer peripheral tube portion 15 of a tubular shape, which is elongated vertically from an outer peripheral edge of the securing side ring plate 14. The stator 12 is integrally formed by fitting the outer peripheral edge of the securing side ring plate 14 to a lower edge of the outer tube portion 15.

Figure 5:
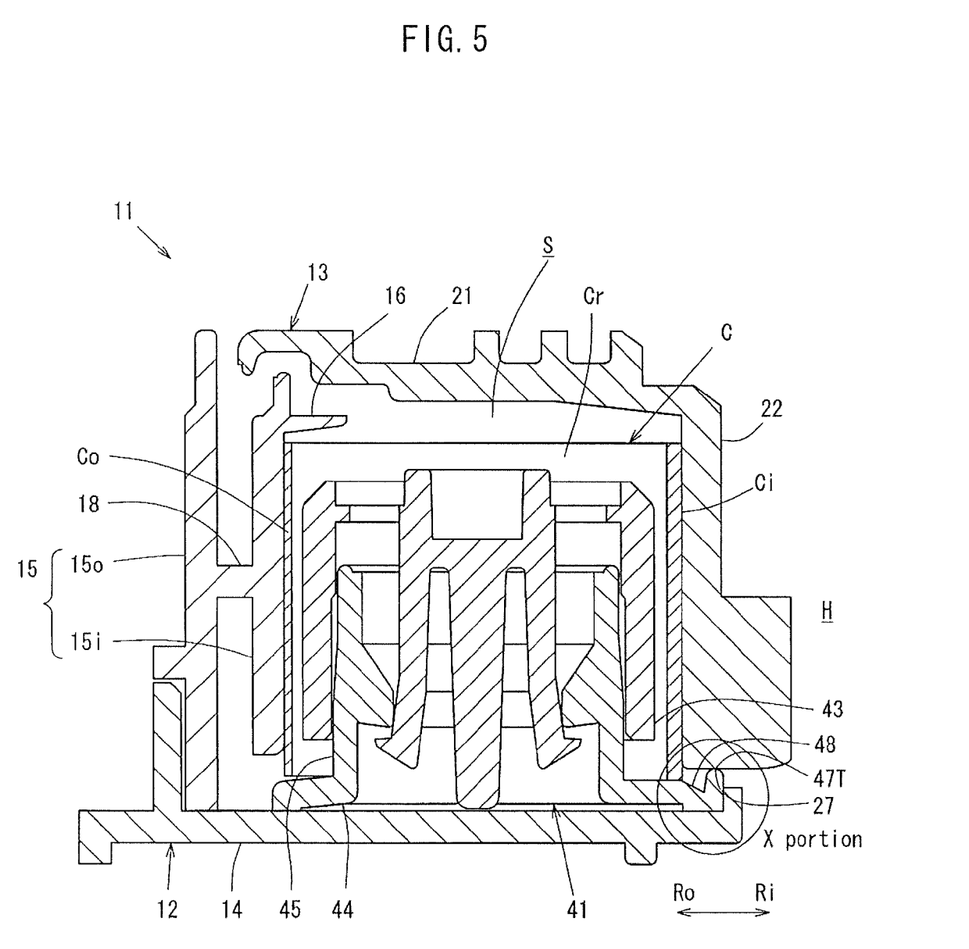
FIG. 5 An enlarged side view showing a part of FIG. 4.

As shown in FIG. 5, the outer peripheral tube portion 15 is formed of an external side outer peripheral tube portion 15o of a tubular shape, and an internal side outer peripheral tube portion 15i of a tubular shape which has a diameter slightly smaller than the external side outer peripheral tube portion 15o, and has a double-layer structure with the external side outer peripheral tube portion 15o and the internal side outer peripheral tube portion 15i being arranged in a concentric pattern so as to oppose each other closely in a radial direction.

Further, as shown in FIG. 5, on an upper portion of the internal side outer peripheral tube portion 15i, a guide protruding piece 16 which protrudes to the internal side in the radial direction (radially inward direction) toward the accommodating space S above the flat cable C wound in a circle in the accommodating space S and which guides the flat cable C from above is formed in a flange shape.

To the stator 12, a stator side connector 17 is attached.

The stator side connector 17 is formed of a first stator side connector 17A and a second stator side connector 17B. The first stator side connector 17A and the second stator side connector 17B are located outside the outer peripheral tube portion 15 (the external side outer peripheral tube portion 15o) such that connecting ports thereof face the same direction with a predetermined space therebetween.

The rotator 13 is formed of a rotating side ring plate 21 which is formed into a ring shape as a top plate and an inner peripheral tube portion 22 of a tubular shape which is elongated vertically from an inner peripheral edge of the rotating side ring plate 21.

Figure 7:
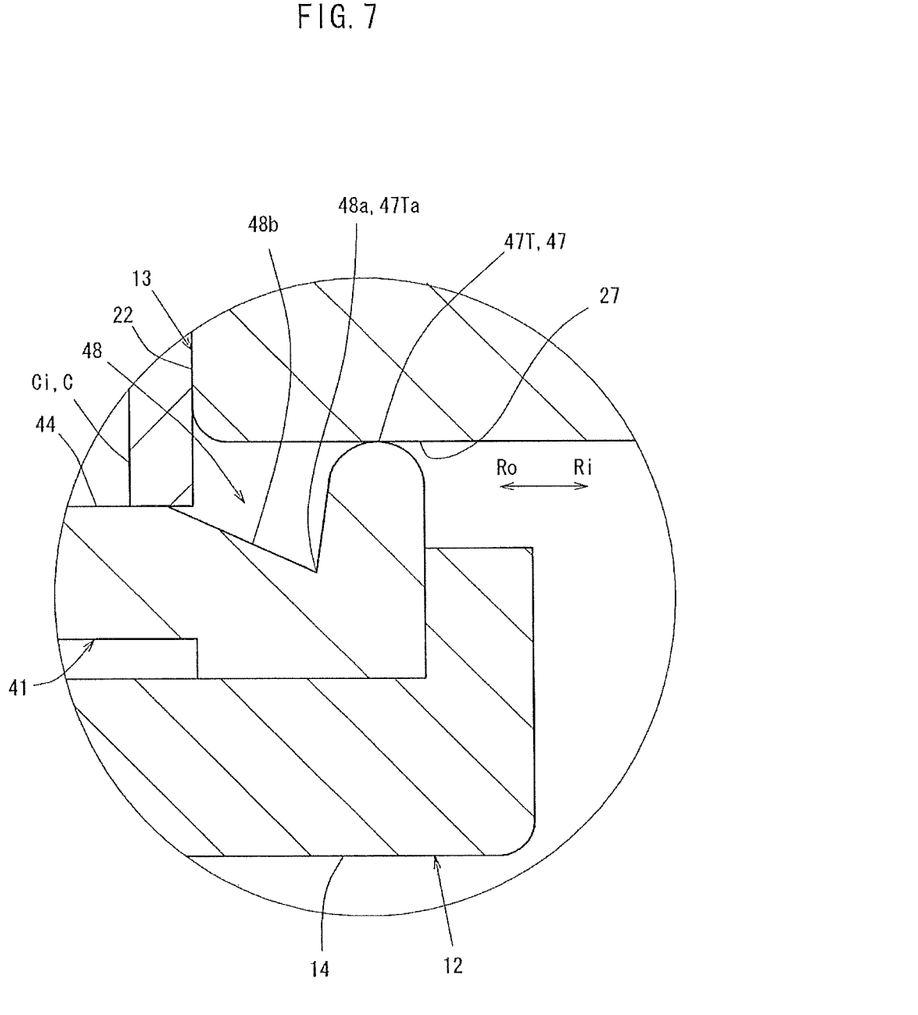
FIG. 7 An enlarged side view showing a area X in FIG. 5.

As shown in FIGS. 4, 5 and 7, on a lower edge periphery portion of the inner tube portion 22, a rotator side abutting portion 27 which abuts an upper surface of the retainer 41 is formed. The rotator side abutting portion 27 is formed into a flat planar shape.

The rotator 13 has a structure such that it rotates together with the steering wheel. Specifically, the rotator 13 can rotate around a shaft same as the rotating shaft of the steering with respect to the stator 12. At this time, the rotator side abutting portion 27 abuts and slides against the upper surface of the retainer 41.

The rotating side ring plate 21 is located so as to oppose the securing side ring plate 14 in a direction of the rotating shaft of the rotator 13.

The direction of the rotating shaft of the rotator 13 is same as the rotating shaft direction of the steering as described above (the vertical direction in FIG. 4).

The inner peripheral tube portion 22 is located so as to oppose the outer peripheral tube portion 15 on the internal side in a radial direction (a horizontal direction in FIG. 4).

To the rotator 13, the rotator side connector 23 which rotates together with rotation of the rotator 13 is attached.

The rotator side connector 23 is formed of a first rotator side connector 23A and a second rotator side connector 23B.

The first rotator side connector 23A and the first stator side connector 17A, and the second rotator side connector 23B and the second stator side connector 17B are electrically connected to each other by the flat cable C located in the accommodating space S.

The stator side connector 17 is connected to cables (not shown) drawn out from an electric circuit or the like on an automobile body in a lower column cover (not shown).

The rotator side connector 23 is connected to cables (not shown) drawn out from an electric circuit such as horn switch, air bag unit and the like, for example.

Further, as shown in FIGS. 2 through 7, the retainer 41 described above is formed of a plurality of rotation rollers 43 and a base ring 42, and is located so as to be rotatable with a rotating shaft of the rotator 13 being the center in the accommodating space S.

The same number of rotation rollers 43 as roller supporting protrusions 45 which will be described later are provided, and are respectively shaft-supported by the roller supporting protrusions 45. Each of the rotation rollers 43 is provided so as to be rotatable with an axis parallel to the rotating shaft of the rotator 13 being the center.

The base ring 42 is formed of a plate-like base ring main body portion 44 which has a ring shape in a plan view, the roller supporting protrusions 45, and a roller outer peripheral side protrusions 46.

The base ring main body portion 44 is placed so as to be slidable with respect to the securing side ring plate 14 in a rotating direction, and is formed so as to be relatively rotatable with respect to the stator 12. When the base ring main body portion 44 is placed on the securing side ring plate 14, an inner peripheral edge portion of the base ring main body portion 44 is between an inner peripheral edge portion of the securing side ring plate 14 and the rotator side abutting portion 27 of the inner peripheral tube portion 22 on a radially internal side Ri of the accommodating space S as shown in FIGS. 6(A), 6(B) and 7.

Figure 6A:
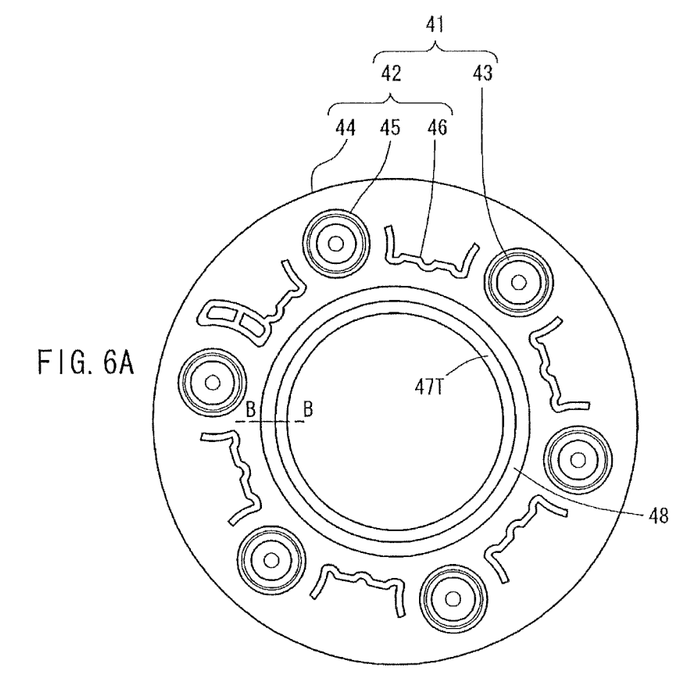
FIG. 6A A schematic diagram explaining a retainer of the present embodiment.
Figure 6B:
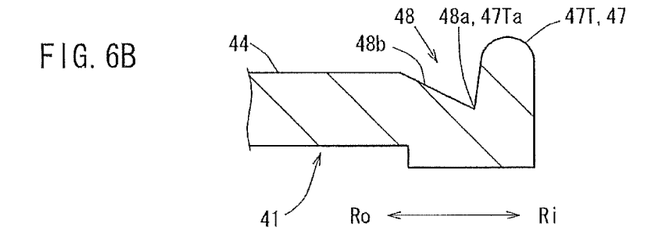
FIG. 6B An enlarged end view along line B-B in FIG. 6A.

FIG. 6([A]) is a plan view of the retainer 41, and FIG. 6(B) is an enlarged end view along line B-B in FIG. 6(A).

As shown in FIGS. 6(A), 6(B) and 7, on the inner peripheral edge portion of the upper surface of the base ring main body portion 44, a retainer side abutting portion 47 which opposes the rotator side abutting portion 27 of the inner peripheral tube portion 22 is formed. The retainer side abutting portion 47 is formed of a retainer side protruding abutting portion 47T which protrudes upward so as to abut the rotator side abutting portion 27 in a slidable manner.

On a radially external side Ro which is immediately outside the retainer side protruding abutting portion 47T on the upper surface of the base ring main body 44, a trench portion 48 recessed along a circumferential direction is formed (see FIGS. 6(A) and 6(B)). The trench portion 48 is formed into a shape of a trench having an outer peripheral side proximal end portion 47Ta of the retainer side protruding abut portion 47T as a deepest portion 48a and an inclined surface 48b which becomes gradually shallower from the deepest portion 48a toward the radially external side Ro (see FIG. 6(B)).

The roller supporting protrusions 45 protrude upward in equal intervals in the circumferential direction of the base ring main body portion 44 in a manner that they can shaft-support the rotation rollers 43.

The roller outer peripheral side protrusions 46 protrude upward with respect to the base ring main body 44 such that they guide folded portions of the flat cable C, which are folded around the rotation rollers 43 as will be described later (reversed portions Cr as will be described later), from the radially external side on the outside of the roller supporting protrusions 45.

Figure 9:
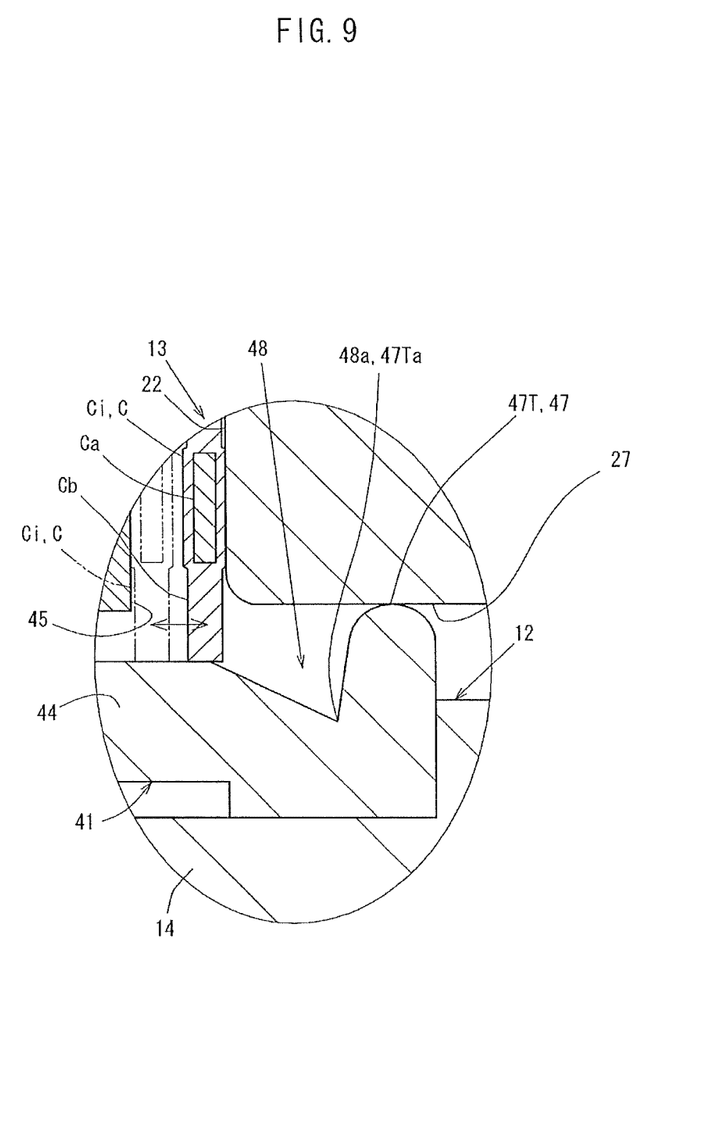
FIG. 9 A diagram explaining functions of the steering roll connector of the present embodiment.

The flat cable C is a flexible transmission line of a band shape which has a plurality of flat rectangular conductors Ca aligned parallel in predetermined pitches and is coated with an electric insulator Cb (see FIG. 9).

Two flat cables C are provided in the accommodating space S, and two cables are overlapped and wound in a circle in the accommodating space S. One end of one of the two overlapped flat cables C in a length direction is connected to the first stator side connector 17A, and one end of the other of the two flat cables C in a length direction is connected to the second stator side connector 17B.

The other end of the one of the two overlapped flat cables C in the length direction is connected to the first rotator side connector 23A, and the other end of the other of the two flat cables C in the length direction is connected to the second rotator side connector 23B.

Such flat cables C are supported by the retainer 41 which is placed so as to be rotatable with respect to the securing side ring plate 14 in the accommodating space S in the cable housing 11, and are accommodated in a state wound into a circle.

Specifically, the flat cables C are drawn into the accommodating space S from the first stator side connector 17A and the second stator side connector 17B in the accommodating space S, and as shown in FIGS. 3 through 5, an outer wound portion Co which is wound along an inner peripheral surface of the outer peripheral tube portion 15 of the stator 12 (internal side outer peripheral tube portion 15i) on the outside of the retainer 41 is formed.

Accordingly, a proximal end of the outer wound portion Co is secured at the position of the stator side connector 17.

As described above, two flat cables C are overlapped and wound in a circle as a pair in the accommodating space S. However, for the sake of convenience, only one is shown in a state wound into a circle in FIGS. 4, 5, 7 and 10.

As shown by a broken line in FIG. 3, the flat cable C is wound to one of the plurality of rotation rollers 43 into a U-shape in the middle of the length direction to form a reversed portion Cr which has a reversed direction.

Then, an inner wound portion Ci is formed by winding the other end of the flat cable C in the length direction along an outer peripheral surface of the inner peripheral tube portion 22 of the rotator 13 on the inside of the retainer 41. The flat cables C are finally drawn out from the accommodating space S and are connected to the first rotator side connector 23A and the second rotator side connector 23B.

Accordingly, a proximal end of the inner wound portion Ci is secured at the position of the rotator connector 23.

In the accommodating space S, the flat cables C are either wound to or released from between the outer wounding portions Co and the inner wounding portions Ci when the rotator 13 rotates with respect to the stator 12.

The reversed portions Cr of the flat cables C appropriately rotate together with the retainer 41 so as to follow changes in a balance in wound states between the outer wound portions Co and the inner wound portions Ci. In this way, the steering roll connector 10 can always retain the flat cables C aligned in the wound state in the accommodating space S, and also enables a smooth rotating operation of the steering wheel.

Figure 1:
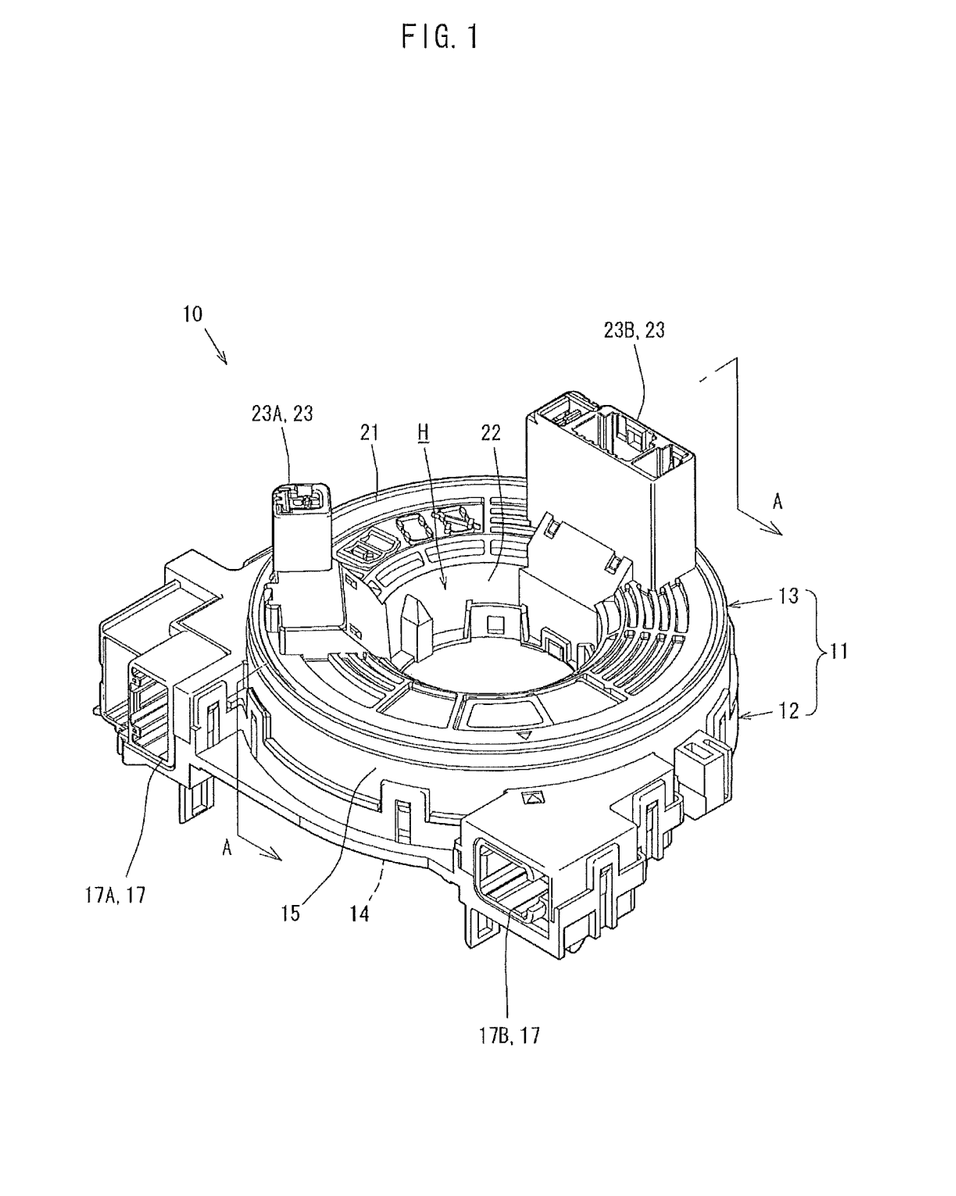
FIG. 1 An outline view of a steering roll connector of the present embodiment.
Figure 2:
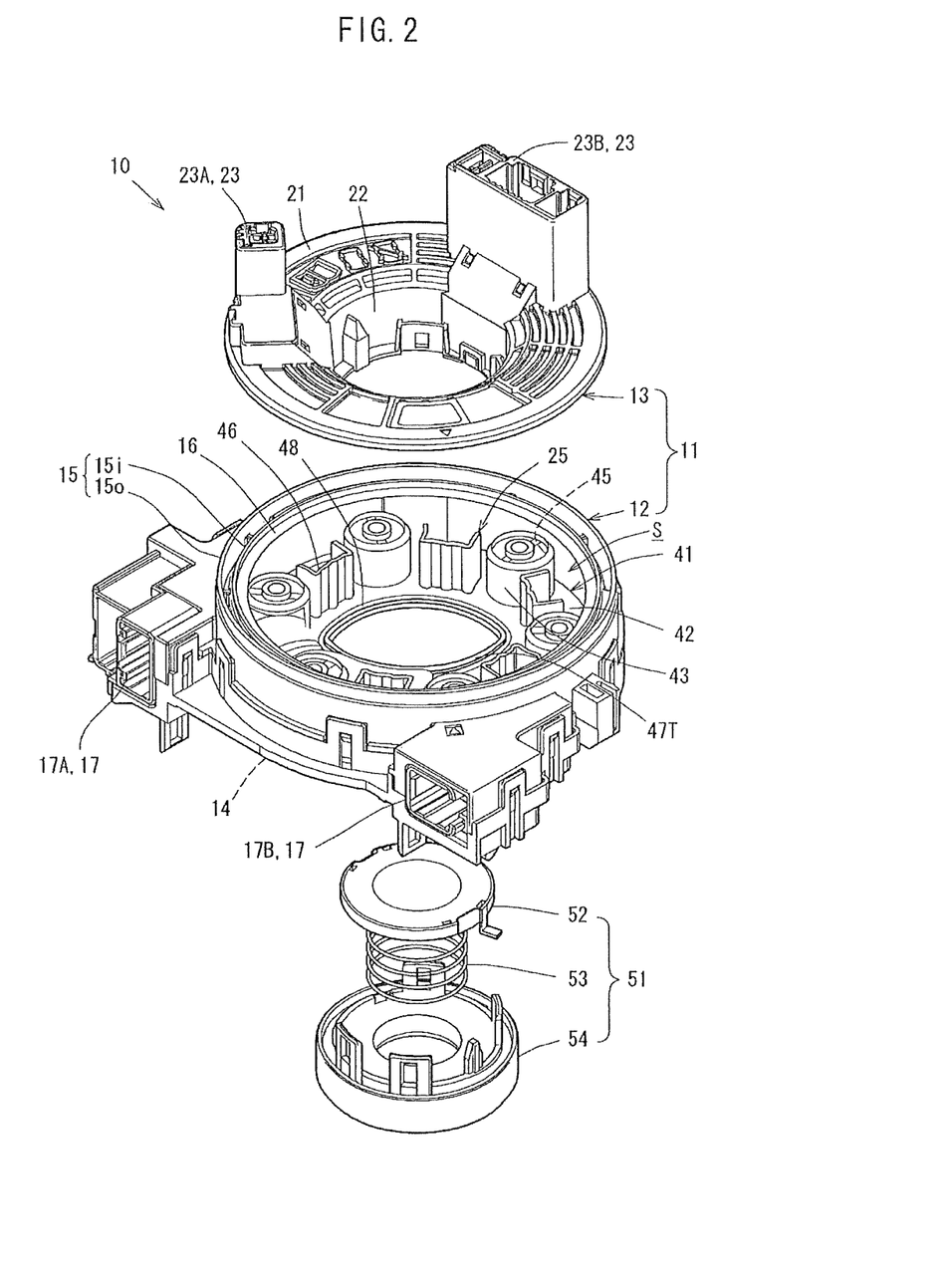
FIG. 2 An exploded perspective view of the steering roll connector of the present embodiment.

Now, the rotation lock structure 51 mentioned above is described briefly. As shown in FIG. 2, the rotation lock structure 51 is formed of a lock member 52, a spring receiving sleeve 54, and a return spring 53 provided between the lock member 52 and the spring receiving sleeve 54.

By pushing up the spring receiving sleeve 54 in resistance to a biasing force of the return spring 53, the rotator 13 can be locked by the lock member 52 so as not to relatively rotate with respect to the stator 12. By inserting a boss portion (not shown) of a metal core of the steering wheel, lock by the lock member 52 can be released so as to allow free relative rotation.

The steering roll connector 10 having a structure as described above can achieve various actions and effects. Particularly, since the retainer side abutting portion 47 is formed of the retainer side protruding abutting portion 47T as described above, the following actions and effects can be achieved.

As shown in FIG. 7, the retainer side protruding abutting portion 47T protrudes toward the rotator side abutting portion 27, it abuts the rotator side abutting portions 27 at a point in a radial direction R across an entire circumference of the retainer 41.

With such a structure, a contact area can be made smaller than that in a structure where the inner peripheral edge portion of the retainer 41 and the lower edge portion of the inner tube portion 22 planarly contact each other as in the conventional art. A sliding resistance between the retainer side abutting portion 47 and the rotator side abutting portion 27 when a rotational operation of the steering wheel is performed can be reduced significantly.

Accordingly, when the flat cable C wound in a circle in the accommodating space S is wound to or released from the outer periphery or the inner periphery of the accommodating space S in association with the rotating operation of the steering wheel, the retainer 41 which supports the flat cable C at the bottom surface of the accommodating space S can smoothly rotate around the shaft of the steering in response to such movement of the flat cable C rapidly.

Therefore, the load, contact resistance and the like of the flat cable C received from the retainer 41 are significantly reduced, and thus, a damage to be caused by abrasion and the like can be prevented.

Specifically, when the rotating operation of the steering wheel is performed, the reversed portion Cr of the flat cable C is loosened between the rotation roller 43 and the roller outer peripheral side protrusion 46 with respect to the rotation roller 43 to which it is wound in a U-shape in association with a change in the state of winding into a circle between the outer wound portion Co and the inner wound portion Ci of the flat cable C.

The retainer 41 has the rotation roller 43 and the roller outer peripheral side protrusion 46 receiving a load from the reversed portion Cr. In this way, the retainer 41 can rotate so as to follow the change in the wound state between the outer wound portion Co and the inner wound portion Ci of the flat cable C.

Since the retainer side abutting portion 47 is formed of the retainer side protruding abutting portion 47T as described above, the retainer 41 can smoothly rotate. It becomes possible that the flat cable C, especially, the reversed portion Cr receive a significantly reduced load from the retainer 41.

Therefore, the load, contact resistance and the like of the flat cable C received from the retainer 41 are significantly reduced, and thus, a damage to be caused by abrasion and the like can be prevented.

Figure 8A:
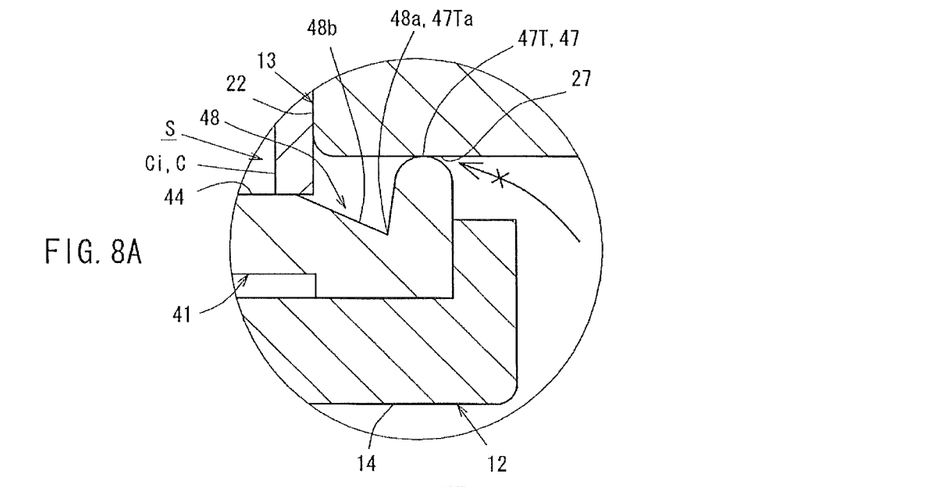
FIG. 8A A diagram explaining functions of the steering roll connector of the present embodiment.

Furthermore, since the retainer side abutting portion 47 is formed of the retainer side protruding abutting portion 47T as described above, as shown in FIG. 8(A), the retainer side protruding abutting portion 47T and the rotator side abutting portion 27 securely abut each other across the entire inner peripheral edge of the retainer 41 with no gap therebetween. Thus, dust can be prevented from entering (see an arrow in FIG. 8(A)).

Figure 8B:
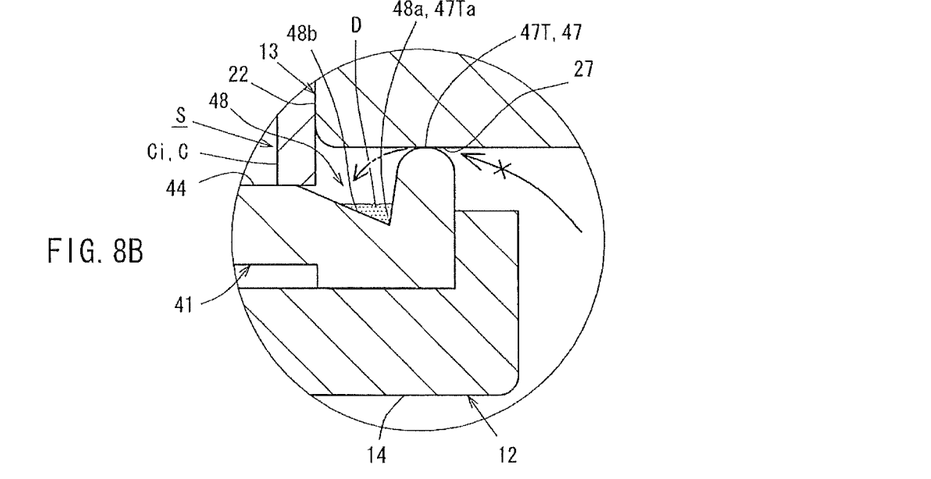
FIG. 8B A diagram explaining functions of the steering roll connector of the present embodiment.

Further, since the trench portion 48 is formed at the lower edge of the retainer side protruding abutting portion 47T of the retainer 41 and at the radially external side Ro of the retainer side protruding abutting portion 47T, as shown in FIG. 8(B), even when dust enters the accommodating space S from outside through the retainer side protruding abutting portion 47T and the rotator side abutting portion 27 (see an arrow shown by a phantom line in FIG. 8(B)), dust D can be kept in the trench portion 48 so as not to disperse in the accommodating space S.

Therefore, such a case that dust attaches to the upper surface of the retainer 41 or the like and dust exists between the flat cable C and the retainer 41 never happens. Thus, the contact resistance between the flat cable C and the retainer 41 can be suppressed. Also, an annoying noise caused by the flat cable C and the retainer 41 scraping each other with dust therebetween can be prevented.

Particularly, the trench portion 48 is formed to have a trench shape with the proximal end portion 47Ta of the retainer side protruding abutting portion 47T being the deepest as described above. Thus, even when dust enters the accommodating space S through a gap between the rotator side abutting portion 27 and the retainer side protruding abutting portion 47T, the dust can be kept in the trench portion 48 immediately after it enters the accommodating space S.

Thus, it becomes possible to ensure that the dust is prevented from dispersing in the accommodating space S.

Further, since the trench portion 48 has a smooth trench shape which becomes gradually shallower from the proximal end portion 47Ta, which is the deepest portion 48a, toward the radially external side Ro of the retainer 41, the rotator side abutting portion 27 and the retainer side protruding abutting portion 47T can smoothly slide without the rotator side abutting portion 27 getting caught by the trench portion 48 while the rotator side abutting portion 27 and the retainer side protruding abutting portion 47T slide in association with the rotating operation of the steering wheel.

Similarly, since the trench portion 48 is formed into the smooth trench shape as described above, as shown in FIG. 9, the inner wound portion Ci of the flat cable C supported by the upper surface inner peripheral portion of the retainer 41 does not get caught by the trench portion 48, and the inner wound portion Ci can be smoothly wound to and released from the outer peripheral surface of the inner tube portion 22.

Therefore, the flat cables C can be smoothly wound to or released from in response to the rotating operation of the steering wheel in the state wound in a circle in which they are always aligned in the accommodating space S.

As described above, the rotator side abutting portion 27 and the retainer side abutting portion 47 are not limited to the above-described structures, and the rotator side abutting portion 27 and the retainer side abutting portion 47 may be formed into shapes such that at least one is protruded toward the other.

Figure 10A:
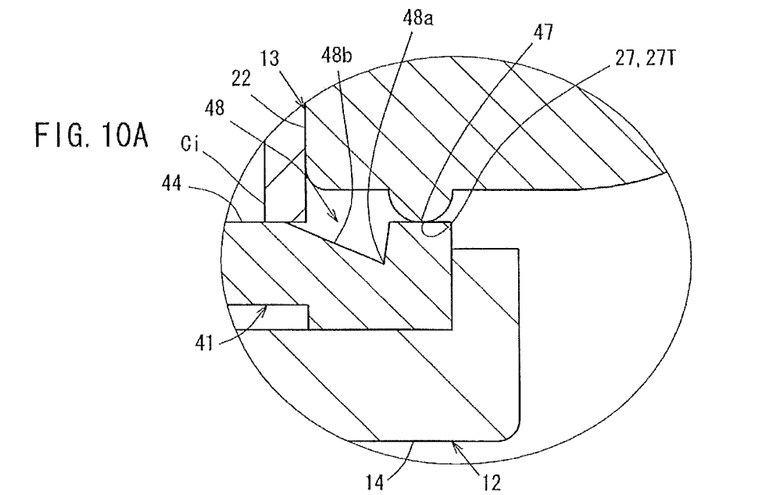
FIG. 10A A schematic diagram explaining the steering roll connector of another embodiment.

For example, as another embodiment, as shown in FIG. 10(A), the retainer side abutting portion 47 is formed so as not to protrude toward the rotator side abutting portion 27 and the rotator side abutting portion 27 may be formed of a rotator side protruding abutting portion 27T which is protruded so as to abut the retainer side abutting portion 47.

Such a structure can also reduce the contact area compared to the case where the retainer side abutting portion 47 and the rotator side abutting portion 27 planarly contact each other, and the sliding resistance between the retainer side abutting portion 47 and the rotator side abutting portion 27 when the rotating operation of the steering wheel is performed can be significantly reduced.

Figure 10B:
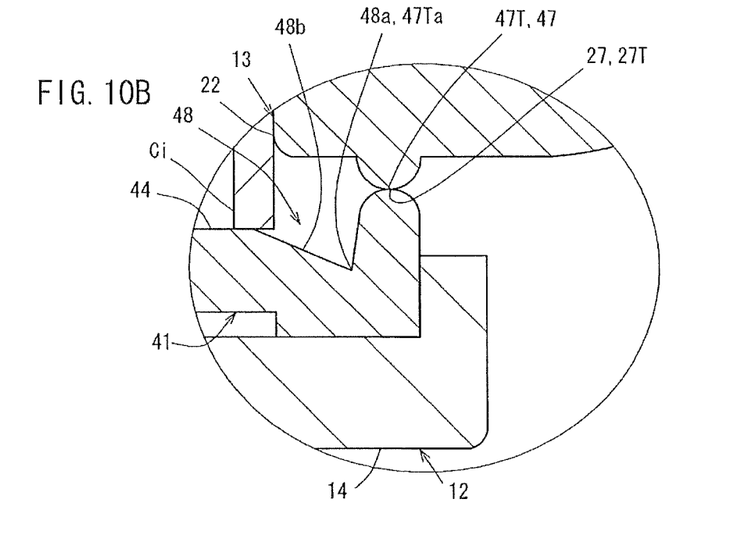
FIG. 10B A schematic diagram explaining the steering roll connector of another embodiment.

As yet another embodiment, as shown in FIG. 10(B), the retainer side abutting portion 47 may be formed of the retainer side protruding abutting portion 47T as described above and the rotator side abutting portion 27 may be formed of the rotator side protruding abutting portion 27T as described above.

In such a structure, the retainer side protruding abutting portion 47T and the rotator side abutting portion 27 abut each other, which means that protruding tip portions abut each other. Since they abut at a point in the radial direction R of the retainer 41, the sliding resistance between the upper surface inner periphery portion of the retainer 41 and the lower portion of the inner tube portion when the rotating operation of the steering wheel is performed can be significantly reduced.

As described above, the present invention is not limited to the above embodiments, and may be formed with various embodiments.

With respect to correspondence between the structure of the present invention and the above embodiments, the rotary connector device corresponds to the steering roll connector 10 and the cable corresponds to the flat cable C.

DESCRIPTION OF THE REFERENCE NUMERALS

10 . . . Steering roll connector
12 . . . Stator
13 . . . Rotator
22 . . . Inner peripheral tube portion
27 . . . Rotator side abutting portion
27T . . . Rotator side protruding abutting portion
41 . . . Retainer
47 . . . Retainer side abutting portion
47T . . . Retainer side protruding abutting portion

47Ta . . . Proximal end portion of retainer side protruding abutting portion
48 . . . Trench portion
S . . . Accommodating space
C . . . Flat cable

The invention claimed is:

1. A rotary connector device, comprising:

a stator and a rotator which rotates with respect to the stator concentrically with a steering;

an accommodating space having a ring shape in a plan view, which is formed inside the stator and the rotator, and which accommodates a cable for electrically connecting the rotator and the stator in a wound state; and a retainer which is located on a bottom surface of the accommodating space so as to be able to guide the cable to rotate concentrically circle with the steering, wherein the rotator includes an inner peripheral tube portion which forms an inner peripheral surface of the accommodating space; and wherein the rotary connector further comprises:

a rotator side abutting portion, which abuts an upper surface inner peripheral portion of the retainer in a slidable manner, formed on a lower portion of the inner peripheral tube portion;

a retainer side abutting portion, which abuts the lower portion of the inner peripheral tube portion in a slidable manner, formed on the upper surface inner peripheral portion of the retainer; and a protruding abutting portion being formed on at least one of the rotator side abutting portion and the retainer side abutting portion so as to protrude toward the other and contacting the rotator side abutting portion; and a trench formed at a side, which faces a rotation axis of the stator and rotator, of the protruding abutting portion, the trench comprising an inclined surface that becomes gradually shallower toward the rotation axis of the stator and rotator.

2. The rotary connector device according to claim 1, wherein the trench comprises a part of an upper surface of the retainer side abutting portion; and wherein the inclined surface of the trench is changed in a continuous manner into a surface substantially perpendicular to a direction of the rotation axis of the stator and rotator.

\* \* \* \* \*